(12) United States Patent
Wang et al.

(10) Patent No.: US 7,275,842 B2
(45) Date of Patent: Oct. 2, 2007

(54) BACKLIGHT MODULE

(75) Inventors: Ming-Fa Wang, Jhunan Township, Miaoli County (TW); Hui-Kai Chou, Taipei (TW)

(73) Assignee: AU Optronics Corp., Hsinchu (TW)

( * ) Notice: Subject to any disclaimer, the term of this patent is extended or adjusted under 35 U.S.C. 154(b) by 234 days.

(21) Appl. No.: 10/785,182

(22) Filed: Feb. 25, 2004

(65) Prior Publication Data

US 2005/0073855 A1  Apr. 7, 2005

(30) Foreign Application Priority Data

Oct. 7, 2003  (TW) .............................. 92127886 A

(51) Int. Cl.
*F21V 7/04* (2006.01)

(52) U.S. Cl. ................... 362/373; 362/633; 362/634

(58) Field of Classification Search ............... 362/600, 362/561, 290, 339, 28, 97, 218, 220; 165/76, 165/177
See application file for complete search history.

(56) References Cited

U.S. PATENT DOCUMENTS

| | | | |
|---|---|---|---|
| 4,205,719 A * | 6/1980 | Norell et al. ................. 165/76 |
| 5,154,507 A * | 10/1992 | Collins ........................ 362/218 |
| 6,661,658 B2 * | 12/2003 | Capriz et al. ............... 361/690 |
| 6,789,923 B2 * | 9/2004 | Liao ........................... 362/294 |
| 6,871,979 B2 * | 3/2005 | Mai ............................ 362/241 |
| 6,880,947 B2 * | 4/2005 | Hsieh et al. ................. 362/614 |
| 2004/0228110 A1 * | 11/2004 | Hsieh et al. .................. 362/31 |
| 2005/0036296 A1 * | 2/2005 | Kim et al. ..................... 362/31 |

* cited by examiner

*Primary Examiner*—Sandra O'Shea
*Assistant Examiner*—Anabel Ton
(74) *Attorney, Agent, or Firm*—Rabin & Berdo, PC

(57) ABSTRACT

A backlight module including an extruded metallic carrier, a reflector sheet, a light source and a diffuser plate is provided. Of which, the extruded metallic carrier has a carrier's top-face and plural heat-dissipating tunnels with an accommodation sink being formed on the carrier's top-face; both the reflector sheet and the light source are deposited in the accommodation sink with the former being situated under the latter; the diffuser plate is situated above the light source. The extruded metallic carrier according to the invention not only maintains the overall evenness of the backlight module but also dissipates the heat outside, hence preventing the diffuser plate from being caved in and deformed due to a high temperature and improving the luminance quality of the backlight module.

17 Claims, 5 Drawing Sheets

BACKLIGHT MODULE

This application claims the benefit of Taiwan application Serial No. 92127886, filed Oct. 7, 2003.

BACKGROUND OF THE INVENTION

1. Field of the Invention

The invention relates in general to a backlight module, and more particularly to a backlight module adopting an extruded metallic carrier with heat radiating function and high structural evenness as the bezel.

2. Description of the Related Art

Along with the rapid advancement in the manufacturing technology of liquid crystal display (LCD) as well as the advantages of compactness, slimness, energy saving and low radiation, LCD has been widely applied in a variety of electronic products such as personal digital assistant (PDA), notebook computer, digital still camera, digital video recorder, mobile phone, computer screen and liquid crystal TV. Further due to a huge input in research and development as well as the adoption of large-scale production facilities, the quality of LCD is continually improved while the cost is further cut down. The application of LCD is therefore expanding and thriving. Since the liquid crystal display panel used in an LCD is non-self-luminous, a backlight module is needed to provide necessary light for the display panel.

Referring to FIG. 1A, a partial sectional view of a conventional backlight module. In FIG. 1A, backlight module 10 includes a bezel 11, a reflector sheet 12, a light source such as plural cold cathode fluorescent lamps (CCFLs) 13 and a diffuser plate 14. Of which, an accommodation sink 11a is formed on the top-face of bezel 11; reflector sheet 12 is adhered onto the cell bottom 11b and two cell walls 11c of accommodation sink 11a. CCFLs 13 are lined up inside accommodation sink 11a with diffuser plate 14 being deposited at the top and reflector sheet 12 at the bottom.

Normally, bezel 11 is made of aluminum alloy via press molding of sheet metal. However, the cost of mold will increase as the size of backlight module 10 becomes larger. Furthermore, referring to FIG. 1B, a larger bezel 10 gets sunken easily, hence affecting the overall evenness greatly. In FIG. 1B, since bezel 11 fails to dissipate the heat generated by CCFLs 13, the luminance of backlight module 10 declines, meanwhile, diffuser plate 14 is likely to be deformed and caved in due to the heat accumulated inside bezel 11.

SUMMARY OF THE INVENTION

It is therefore an object of the invention to provide a backlight module whose design of using an extruded metallic carrier as the bezel not only maintains the overall evenness of the backlight module and prevents the bezel from being deformed and caved in when the size becomes larger, but also helps to dissipate the heat generated inside the bezel to prevent the diffuser plate from being caved in and deformed due to the accumulated heat and to further improve the luminance quality of the backlight module.

It is another object of the invention to provide a backlight module including an extruded metallic carrier and a light source, wherein the extruded metallic carrier has a carrier's top-face and plural heat-dissipating channels. Of which, an accommodation sink is formed on the carrier's top-face while the light source is deposited in the accommodation sink.

It is another object of the invention to provide a backlight module including an extruded metallic carrier and a light source, wherein the extruded metallic carrier has a base body and two lateral bodies. Of which, the base body has a body's top-face and plural first heat-dissipating channels; the two lateral bodies, which are deposited on two ends of the body's top-face and form an accommodation sink together with the base body, have plural second heat-dissipating channels; the light source is deposited in the accommodation sink.

It is another object of the invention to provide a backlight module including an aluminum extrusion carrier, a reflector sheet, plural cold cathode fluorescent lamps (CCFLs) and a diffuser plate. Of which, the aluminum extrusion carrier has a carrier's top-face and plural heat-dissipating channels; an accommodation sink in which the reflector sheet is deposited is formed on the carrier's top-face. These CCFLs, which are lined up in the accommodation sink, are deposited above the reflector sheet, while the diffuser plate is deposited above these CCFLs.

Other objects, features, and advantages of the invention will become apparent from the following detailed description of the preferred but non-limiting embodiments. The following description is made with reference to the accompanying drawings.

DETAILED DESCRIPTION OF THE INVENTION

EXAMPLE ONE

Figure 1A:
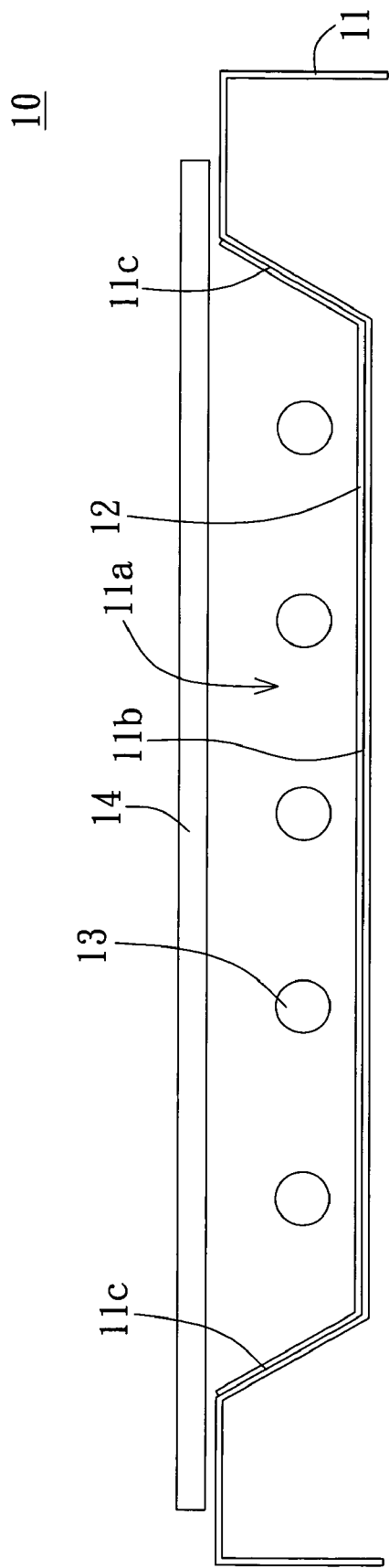
FIG. 1A is a partial sectional view of a conventional backlight module.
Figure 1B:
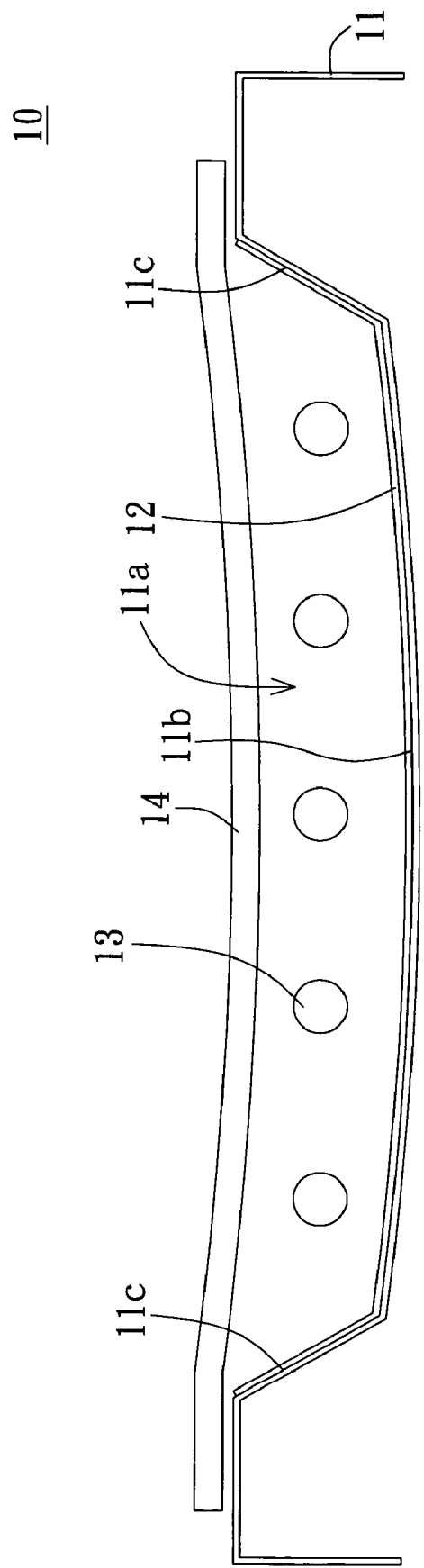
FIG. 1B is a sectional view showing the status when the bezel and diffuser plate in FIG. 1A are deformed.
Figure 2:
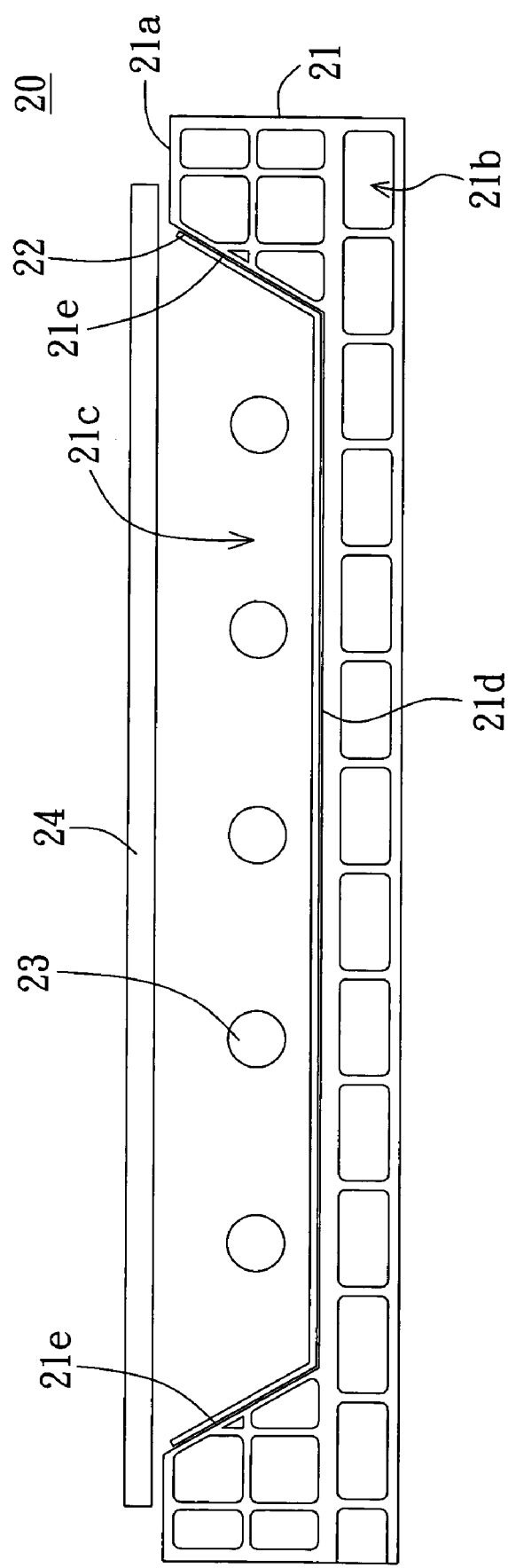
FIG. 2 is a sectional view of a backlight module according to preferred embodiment one of the invention.

Referring to FIG. 2, a sectional view of a backlight module according to preferred embodiment one of the invention. In FIG. 2, backlight module 20 at least includes an extruded metallic carrier 21, a reflector sheet 22, a light source 23 and a diffuser plate 24. Extruded metallic carrier 21 has a carrier's top-face 21a and plural heat-dissipating channels 21b with an accommodation sink 21c being formed on carrier's top-face 21a. Of which, extruded metallic carrier 21 can be an aluminum extrusion carrier while reflector sheet 22 is deposited in accommodation sink 21c. For example, reflector sheet 22 can be formed on the cell bottom 21d and two cell walls 21e of accommodation sink 21c by ways of pasting or coating.

Light source 23 which is deposited in accommodation sink 21c is situated above reflector sheet 22. Light source 23 can be plural cold cathode fluorescent lamps (CCFLs) which are lined up in accommodation sink 21c and are situated above reflector sheet 22. Moreover, diffuser plate 24 is deposited above light source 23. For example, diffuser plate 24 whose two ends are situated on carrier's top-face 21a can seal the upper opening of accommodation sink 21c up.

EXAMPLE TWO

Figure 3:
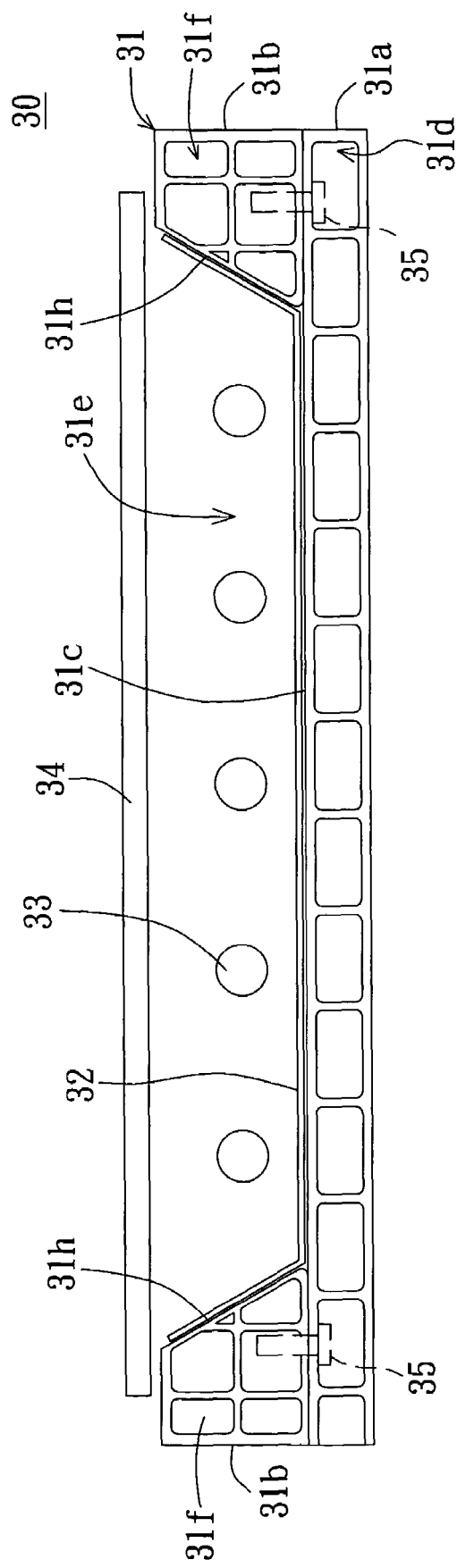
FIG. 3 is a sectional view of a backlight module according to preferred embodiment two of the invention.
Figure 4:
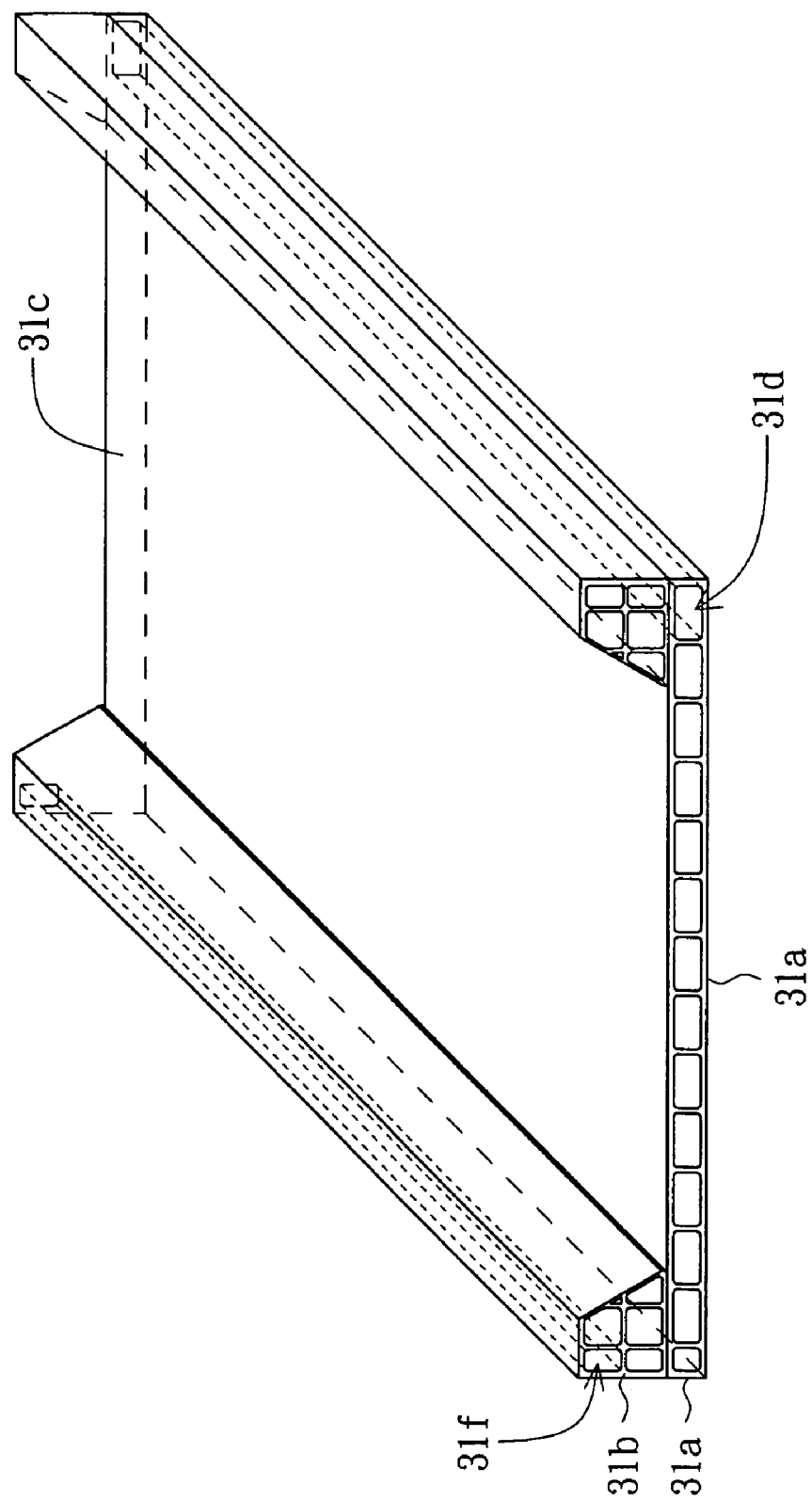
FIG. 4 is a perspective view of the extruded metallic carrier in FIG. 3.

Referring to FIG. 3, a sectional view of a backlight module according to preferred embodiment two of the invention. In FIG. 3, backlight module 30 at least includes an extruded metallic carrier 31, a reflector sheet 32, a light source 33 and a diffuser plate 34. FIG. 4 is a perspective view of the extruded metallic carrier in FIG. 3. For the sake of explicitness, some heat dissipating channels and screws which are shown in FIG. 3 are omitted in the FIG. 4. Referring to FIGS. 3 and 4, extrude metallic carrier 31 has a base body 31*a* and two lateral bodies 31*b*, wherein base body 31*a* has a body's top-face 31*c* and plural first heat-dissipating channels 31*d*. Of which, two lateral bodies 31*b*, which are deposited on two ends of body's top-face 31*c* and form an accommodation sink 31*e* together with base body 31*a*, have plural second heat-dissipating channels 31*f*.

It is noteworthy that two lateral bodies 31*b* are deposited on two ends of body's top-face 31*c* by forming a screw joint with base body 31*a*. For example, plural screws 35 screw base body 31*a* together with two lateral bodies 31*b* to form extruded metallic carrier 31. Of which, extruded metallic carrier 31 can be an aluminum extrusion carrier.

Besides, reflector 32 is deposited in accommodation sink 31*e*. For example, reflector sheet 32 can be formed on the body's top-face 31*c* of accommodation sink 31*e* or two cell walls 31*h* of accommodation sink 31*e* by ways of pasting or coating.

Light source 33 is deposited in accommodation sink 31*e* and is situated above reflector sheet 22. Light source 33 can be plural cold cathode fluorescent lamps (CCFLs) which are lined up in accommodation sink 31*e* and are situated above reflector sheet 32. Moreover, diffuser plate 34 is deposited above light source 33. For example, diffuser plate 34 whose two ends are situated on the top-face of two lateral bodies 31*b* can seal the upper opening of accommodation sink 31*e* up.

The backlight module disclosed in the above preferred embodiments according to the invention whose extruded metallic carrier manufactured using extrusion molding process is strong in structure and good at anti-deformation, therefore maintains the structural evenness of the backlight module and is ideal for large size backlight module. Besides, an extruded metallic carrier not only can be easily fit into a complicated design, but also costs less. Moreover, an extruded metallic carrier dissipates the heat generated by the light source more efficiently, hence preventing the diffuser plate from being caved in and deformed due to a high temperature, meanwhile, improving the luminance quality of the backlight module.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module comprising at least:
   an extruded metallic carrier, wherein the extruded metallic carrier has a top-face with an accommodation sink being formed thereon and a plurality of heat-dissipating tunnels enclose by the extruded metallic carrier except for that at least two openings at two ends of each dissipating tunnel appear on two oppositely lateral surface of the extruded metallic carrier; and
   a light source which is deposited in the accommodation sink.

2. The backlight module according to claim 1, wherein the extruded metallic carrier further comprises a base body and two lateral bodies, of which, the base body has a body's top-face while the two lateral bodies are deposited on two ends of the body's top-face and form the accommodation sink together with the base body.

3. The backlight module according to claim 1, wherein the extruded metallic carrier has a constant cross-sectional profile along its entire length.

4. The backlight module according to claim 2, wherein the two lateral bodies are deposited on two ends of body's top-face by forming a screw joint with the base body.

5. The backlight module according to claim 1, wherein the extruded metallic carrier is an aluminum extrusion carrier.

6. The backlight module according to claim 1, wherein the light source comprises a plurality of cold cathode fluorescent lamps (CCFLs) lined up in the accommodation sink.

7. The backlight module according to claim 1, wherein backlight module further comprises:
   a reflector sheet which is deposited in the accommodation sink and is situated under the light source.

8. The backlight module according to claim 1, wherein backlight module further comprises:
   a diffuser plate deposited above the light source.

9. A backlight module comprising at least:
   an extruded metallic carrier which has a base body and two lateral bodies, wherein the base body has a body's top-face and a plurality of first heat-dissipating tunnels which are disposed under the body's top-face within the base body, while the two lateral bodies, which are deposited on two ends of the body's top-face and form an accommodation sink together with the base body, have a plurality of second heat-dissipating tunnels which are disposed within the two lateral bodies, wherein the first and second heat-dissipating tunnels are enclosed by the extruded metallic carrier except for that at least two openings at two ends of each dissipating tunnel appear on two oppositely lateral surface of the extruded metallic carrier; and
   a light source deposited in the accommodation sink.

10. The backlight module according to claim 9, wherein the two lateral bodies are deposited on two ends of body's top-face by forming a screw joint with the base body.

11. The backlight module according to claim 9, wherein the extruded metallic carrier is an aluminum extrusion carrier.

12. The backlight module according to claim 9, wherein the light source is a plurality of cold cathode fluorescent lamps lined up in the accommodation sink.

13. The backlight module according to claim 9, wherein backlight module further comprises:
   a reflector sheet which is deposited in the accommodation sink and is situated under the light source.

14. The backlight module according to claim 9, wherein backlight module further comprises:
   a diffuser plate deposited above the light source.

15. A backlight module comprising at least:
   an aluminum extrusion carrier which has a carrier's top-face with an accommodation sink being formed thereon and a plurality of heat-dissipating tunnels disposed under the carrier's top-face and enclosed by the aluminum extrusion carrier except for that at least two openings at two ends of each dissipating tunnel appear on two oppositely lateral surface of the extruded metallic carrier;

a reflector sheet deposited in the accommodation sink;
a plurality of cold cathode fluorescent lamps lined up in the accommodation sink; and
a diffuser plate deposited above the light source.

16. The backlight module according to claim 15, wherein the aluminum extrusion carrier further comprises a base body and two lateral bodies, of which, the base body has a body's top-face while the two lateral bodies are deposited on two ends of the body's top-face and form an accommodation sink together with the base body.

17. The backlight module according to claim 16, wherein the two lateral bodies are deposited on two ends of body's top-face by forming a screw joint with the base body.

* * * * *